United States Patent Office 3,243,596
Patented Mar. 29, 1966

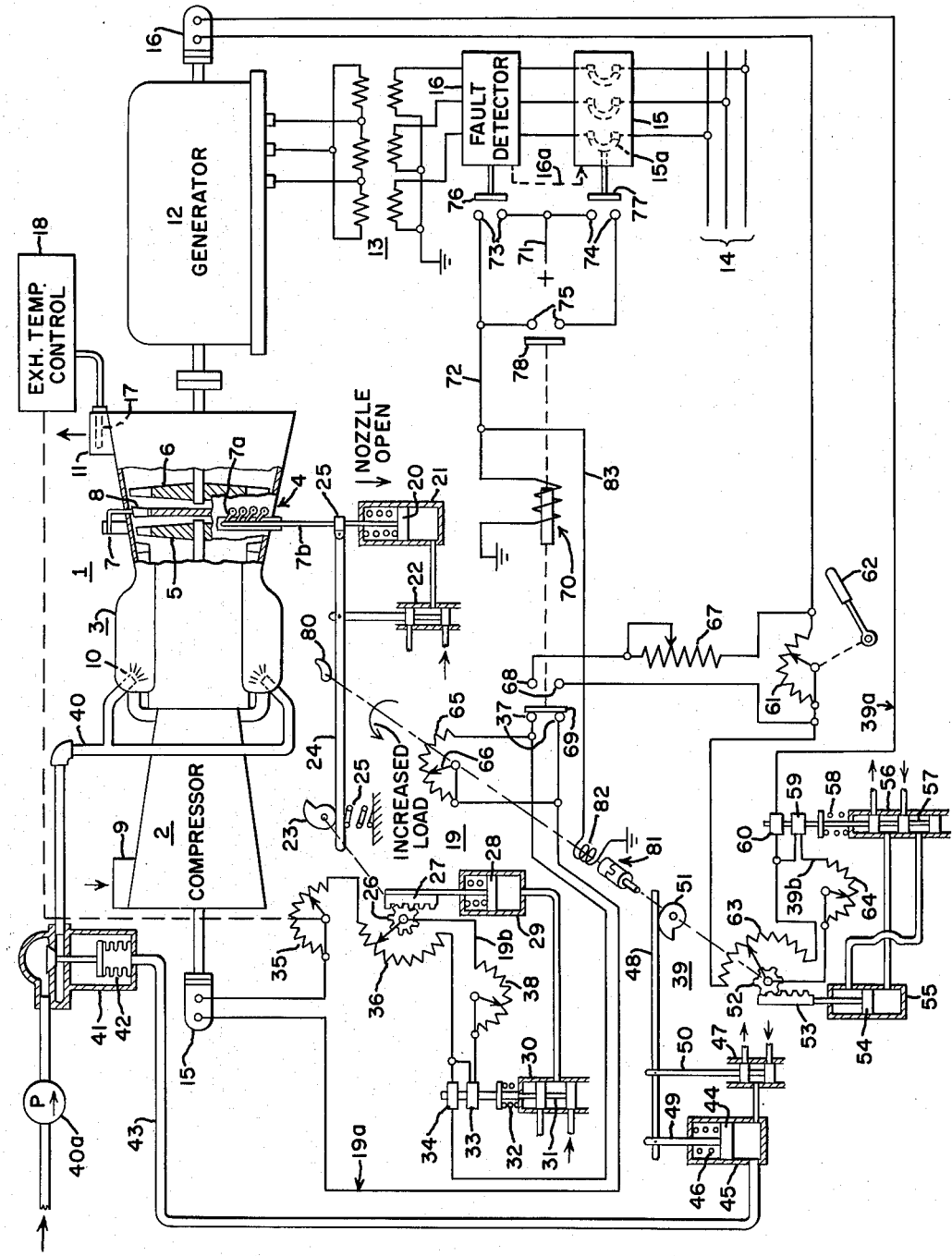

3,243,596
GAS TURBINE POWER SYSTEM STABILIZER
Arne Loft, Schenectady, N.Y., assignor to General
Electric Company, a corporation of New York
Filed Nov. 21, 1963, Ser. No. 325,411
6 Claims. (Cl. 290—40)

This invention relates to improvements in electrical power generating equipment, comprising a generator driven by a gas turbine. More particularly, the invention relates to a control system for stabilizing a gas turbine of the type having a turbine-compressor unit discharging motive fluid into a mechanically independent load turbine when the gas turbine is driving a generator supplying an electrical load.

Transient conditions on electrical power transmission lines can cause sudden and extreme variations in the power level at the generating end of the line. For example, a fault on one section of the line, as in shortcircuit conditions, causes a substantial surge in generator output, whereas the power input supplied by the prime mover does not substantially change. Immediately thereafter, with the usual fault detecting equipment and circuit breakers, the breakers open, isolating the section of the line with the fault, causing an open circuit condition or loss of load, during which the power output from the generator may be substantially zero while the power input by the prime mover is still relatively unchanging, due to the rapidity of events. Still later, the circuit breakers are closed and substantially the same or even more power output than before the fault is required from the generator. All three of the foregoing events may take place within one second, perhaps on the order of one-half second.

As will be understood by those skilled in the art, the power angle curve reveals that for a given generator, the phase shift between sending and receiving end voltages, i.e., the phase position of the generator rotor with respect to the load it is supplying, is determined by the power being supplied to the load.

It will also be understood that under steady state conditions, the power input by the prime mover equals the power output supplied by the generator. Therefore, at any given steady state speed the positive torque applied to the rotors by the motive fluid on the blades balances a negative torque due to the electromagnetic forces on the generator rotor. A change in either of these results in a "net torque" which tends to accelerate or decelerate the rotors.

When the transmitted power or power output is high, and the load is lost on the generator, the "net torque" applied to the generator rotor by the prime mover (whose power input is essentially the same) is greatly increased and there is a tendency for the rotor to accelerate. Acceleration increases the phase position of the generator rotor with respect to the load and if not corrected, the phase shift angle will increase until the generator pulls out of synchronism. One factor resisting tendency of the rotors to accelerate is their combined moment of inertia. Hence, prime movers whose rotating parts have a large moment of inertia, are inherently more stable and resist a tendency to overspeed upon loss of load. On the other hand, once there is a corrective action initiated, causing an acceleration or deceleration of the rotor toward a new phase position, corresponding to a new power level, the high moment of inertia rotor resists efforts to halt the corrective action it is taking.

Prime movers such as single shaft gas turbines, due to the heavy rotors with many stages of blading, and including the compressor which furnishes no useful energy, are considered to have relatively high moments of inertia. On the other hand, a two-shaft gas turbine comprises a compressor-turbine rotor with a relatively high moment of inertia which is sharing the motive fluid with a load turbine having a relatively low moment of inertia, the latter often having only a single stage of blading. These machines are referred to hereinafter as two-shaft gas turbines, although it will be understood that three-shaft gas turbines operating on the same principle are also possible. With two-shaft gas turbines having fixed nozzle partitions between the compressor turbine and the load turbine, the power available in the motive fluid is divided in fixed proportions between the compressor turbine and the load turbine. However, with two-shaft gas turbines having a variable nozzle, i.e., movable nozzle partitions which change the effective area through the nozzles, and with which the present invention is concerned, the division of available power between the high inertia compressor turbine and the low inertia load turbine may readily be adjusted.

As pointed out previously, the load turbine of a two-shaft gas turbine, since it has a low moment of inertia, may have a tendency toward instability on sudden loss of load, or during other transient conditions, due to its quickness to accelerate and decelerate.

It has previously been suggested, in connection with steam turbines, to increase the stability of the power transmission system by reducing the power input, i.e., such as by reducing steam flow or by bypassing steam at the turbine inlet, in response to a fault indication. One difficulty in such arrangements lies in dissipating the energy represented by steam contained throughout the turbine and interstage conduits, which possibly include a reheater. Such energy continues to manifest itself as torque on the rotor tending to accelerate it, even after the steam at the source is shut off, until the energy contained within the system is dissipated. The time required to dissipate this energy is relatively long in relation to the time during which changes are occurring in the electrical load. The success of such a scheme depends upon reclosing of the breakers, i.e., reapplying the load in a relatively short time if loss of synchronism is to be avoided.

Accordingly, one object of the present invention is to provide a gas turbine control system which provides improved stability when supplying an electrical load.

Another object of the invention is to provide an improved gas turbine control system which is stable on single phase faults, without having to rely on fast fault clearing or reclosure of the breakers.

Another object of the invention is to provide an improved gas turbine power system stabilizer for a two-shaft gas turbine-generator combination, which reduces the tendency of the generator to "pull out of step" during transient conditions.

Still another object of the invention is to provide a gas turbine control system for initiating almost instantaneous corrective action to prevent overspeed during loss of load.

Yet another object of the invention is to provide an improved stabilizing control system for a two-shaft gas turbine, wherein the degree of corrective action taken can be determined by the power level of the turbine prior to the transient phenomenon, such as loss of load.

Briefly stated, the invention is practiced in its preferred form by employing electrical fault-detecting equipment to quickly open a variable angle nozzle in a two-shaft gas turbine upon indication of a loss of load and at the same time to initiate a reduction of fuel flow to the gas turbine combustion chambers. Opening the nozzle shifts a large portion of the energy available in the motive fluid within the machine from the low inertia load turbine to the high inertia compressor-turbine. Overspeeding of the latter is minor due to its high inertia and will not cause instability of the electrical generating portion of the system. The amount of nozzle opening and new speed setting for the compressor-turbine is automatically determined by the load level carried on the gas turbine prior to the fault.

The organization and operation of the invention, together with further objects and advantages thereof, may best be understood by reference to the following description taken in connection with the accompanying drawing, in which the single figure is a simplified schematic diagram of a two-shaft gas turbine employing the power system stabilizer of the invention.

Referring to the drawing, a two-shaft gas turbine is shown generally at 1. Gas turbine 1 comprises a compressor 2, supplying air to combustion chambers 3. The hot gases then flow through a turbine casing 4. The turbine casing 4 houses a compressor turbine 5, which is connected to drive compressor 2, and a mechanically independent load turbine 6. Division of the available pressure drop of the motive fluid across the blades of turbines 5, 6 is accomplished by varying the effective flow area through the nozzle blades 8. Increasing this area gives a greater pressure drop, hence greater power output, in turbine 5, and at the same time gives a lesser pressure drop, or less power, in turbine 6. Movement of the nozzle blades 8 is accomplished by means of a nozzle adjusting ring 7, which operates multiple lever arms 7a to change the effective area through the blades. Nozzle ring 7 is rotated by a positioning mechanism depicted schematically as an actuating rod 7b. A suitable arrangement for a variable angle nozzle may be seen in U.S. Patent 2,919,890 issued to A. N. Smith et al., on January 5, 1960, and assigned to the present assignee.

Air, entering the compressor at inlet 9, is compressed and furnishes oxygen for combustion of fuel entering the combustion chambers through fuel nozzles 10. The hot combustion gases leave the turbine casing 4 through an outlet 11. The load turbine 6 is mechanically connected to an electrical generator 12, supplying electrical power through a conventional transformer 13, to electrical power transmission lines 14. Interposed between transformer 13 and transmission lines 14 is a circuit breaker 15, which is actuated by a fault detecting mechanism 16, as indicated by dotted line 16a to open the breakers 15a in the event of a fault on transmission lines 14.

Various operating conditions of the gas turbine 1 may be used to sense changes and employed to effect normal control over its operation. In the type of control system shown, these include a tachometer generator 15 for the low pressure or turbine-compressor unit and a tachometer generator 16 for the high pressure or load unit. Generators 15, 16 supply voltages and frequencies proportional to the speeds of the respective rotors as is well known in the art. When main generator 12 is electrically coupled to an electrical transmission system, supplied by other generators, variations in the governor stabilizing rheostat and cam will be indicative of the load carried by generator 12. An additional sensor of the operating condition of the powerplant is provided by means of an exhaust gas temperature indicator 17, which actuates an exhaust temperature control mechanism 18 to set the desired speed of the turbine-compressor unit. Full details of the exhaust temperature control mechanism 18 are omitted as not being pertinent to the present invention, but they may be had by reference to U.S. Patent 2,625,789 issued to N. E. Starkey on January 20, 1953, and assigned to the present assignee.

It will be understood that various other operating conditions of the gas turbine 1, such as compressor discharge pressure, may be employed to effect normal control over the gas turbine, either in conjunction with or in lieu of the conditions shown.

The means used to effect control over the gas turbine in accordance with the variations in the aforementioned operating conditions are through adjustments in the rate of the fuel supply to combustion chambers 3 and through adjustment of the variable nozzle vanes 8. These adjustments are made by the "fuel regulator" and the "nozzle regulator" respectively.

The nozzle regulator employs an electrohydraulic servomechanism shown generally as 19 to change the position of the variable nozzle actuating rod 7b in order to hold the speed of the high pressure turbine (sensed by tachometer generator 15) at a value which is determined by the temperature of the exhaust gas. Rod 17b is positioned by piston 20 of a hydraulic cylinder 21, which is supplied by a pilot valve 22. The rotation of a cam 23 raises or lowers the left-hand end of a floating lever 24 against a spring 25, to move the stem of pilot valve 22. The right-hand end of lever 24 is connected to a collar 25 on the rod of piston 20, so as to restore pilot valve 22 to a neutral position after piston 20 has moved.

Rotation of the cam 23 is caused by means of a pinion 26, actuated by rack 27 which follows the movements of a piston 28. Piston 28 is housed in a cylinder 29 supplied with hydraulic fluid under pressure by means of a solenoid controlled pilot valve 30. The stem 31 of pilot valve 30 is held balanced in a neutral position by the forces exerted by compression spring 32, solenoid stabilizing coil 33, and solenoid control coil 34. A series electrical circuit 19a supplied by tachometer generator 15 consists of a rheostat 35 (the resistance of which is set by exhaust temperature controller 18), resistance 36, the windings of control coil 34, and normally closed contacts 37. An electrical feedback circuit 19b is established through a portion of resistance 36, rheostat 38, and the winding of stabilizing coil 33.

Rheostat 35 is connected so that increased exhaust temperature sensed by the sensor 17 causes the controller 18 to increase the resistance of the control circuit. This reduces the flow of current through the solenoid control coil 34, thereby allowing the compression spring 32 to raise solenoid pilot stem 31. This lets piston 28 descend, rotating pinion 26 and cam 23 clockwise. This action causes the left-hand end of lever 24 to rise which, in turn, increases the nozzle opening.

A wider nozzle opening has the effect of increasing torque on low pressure turbine 5 and decreasing torque on load turbine 6. This shift of torques is practically instantaneous. Clockwise movement of the pinion 26 decreases the resistance of the feedback electrical circuit 19a and increases the flow of current through stabilizing coil 33, thereby restoring solenoid pilot valve stem 31 to a neutral position, halting the movement of the nozzle opening mechanism.

Although the aforementioned chain of events was described as occasioned by increased resistance in the series control circuit 19a due to increase in the exhaust temperature, an equivalent effect is had by decrease in voltage supplied to the control circuit 19a by tachometer generator 15, due to a slowing down of the compressor, in which case the nozzle will also be opened to supply additional torque to the low pressure turbine 5 and bring it back to its set speed.

The fuel regulator functions in much the same way as does the nozzle regulator through an electrohydraulic servomechanism 39. Fuel is supplied to the fuel nozzles 10 through a supply line 40 by means of a pump 40a. A fuel control valve 41 is shown schematically as operative in response to pressure changes inside a bellows 42, communicating with a hydraulic control oil line 43. An increase in hydraulic pressure in line 43 will move control valve 41 to a more open position to increase the flow of fuel to nozzles 10.

The pressure in line 43 is a unique function of the position of a piston 44 in a cylinder 45, due to the opposing force of compression spring 46. Hydraulic fluid from a suitable source under pressure is admitted to and discharged from cylinder 45 by means of a pilot valve 47. A floating lever 48 is connected to the stems 49, 50, of the hydraulic cylinder and pilot valve respectively and is actuated by the rotation of a cam 51. Counterclockwise rotation of cam 51 will lower the right-hand end of lever 48 and piston 44 will move upward, restoring the pilot valve to its neutral position. This increases the pressure below piston 44 and opens the fuel control valve 41.

Cam 51 is rotated by a pinion 52 and rack 53, the latter being raised or lowered by piston 54 in a cylinder 55. A solenoid controlled pilot valve 56, controls the flow of hydraulic fluid from a suitable pressurized source to the cylinder 55. The stem 57 of pilot valve 56 is held in its neutral position by balancing of forces exerted by a compression spring 58, a solenoid stabilizing coil 59, and a solenoid control coil 60.

The electrical control circuit for the fuel regulator consists of a series circuit 39a supplied by tachometer generator 16, and consisting of a rheostat 61 (the resistance of which is controlled by hand lever 62) a resistance 63, and winding of control coil 60. A second electrical feedback circuit 39b is connected in parallel with a portion of the aforementioned series circuit, and consists of a portion of the resistance 63, a rheostat 64, and the winding of stabilizing coil 59.

The operation of the fuel regulator, which is also largely conventional, may be briefly described as follows. Either a decrease of voltage supplied to the electrical circuit by tachometer generator 16 (this being indicative of the slowing down of the generator 12 due to increased load thereon) or a change in the setting of hand lever 62 so as to increase the resistance of rheostat 61 will decrease the flow of current through control circuit 39a and solenoid control coil 60. The compression spring 58 will move the stem 57 of the pilot valve upward which acts to lower piston 54 and rack 53, rotating cam 51 counterclockwise. As explained previously, this opens the fuel control valve 41 and allows more fuel to be burned in combustion chambers 3.

As the pinion 52 rotates counterclockwise, the resistance of the electrical feedback circuit 39b is decreased and more current flows through the stabilizing coil 59, causing the pilot valve stem 57, to resume its neutral position.

The foregoing described operation of the gas turbine control system is largely conventional but it is necessary to provide a background for understanding the present invention. To briefly recapitulate, an increase in the resistance of the nozzle regulator control circuit 19a will cause the gas turbine nozzles 8 to open. Conversely, a decrease in resistance of the control circuit 39a of the fuel regulator causes the fuel valve 41 to move to a more closed position.

In order to provide means to increase the resistance of the nozzle regulator circuit 19a, a variable rheostat 65, is connected in parallel with the contacts 37. When the contacts are open, the value of the resistance set on rheostat 65 by means of the movable tap 66, is added to the resistance of the nozzle regulator control circuit 19a.

In order to provide means to decrease the resistance of the fuel regulator circuit, an adjustable rheostat 67 is connected in parallel with rheostat 61 through a pair of normally open contacts 68. When contacts 68 are closed, there will be a decreased resistance of the fuel regulator control circuit.

Armature 69 of a solenoid relay 70 is arranged to open contacts 37 and close contacts 68 when the coil of relay 70 is energized. The current source for the coil of relay 70 is a suitable source of electrical potential 71 supplied to a lead 72 through two alternate paths consisting first of normally open contacts 73 and secondly, of normally open contacts 74 and normally open contacts 75. Contacts 73 are closed by an armature 76, which is actuated by fault detector 16 in the event of a transient condition such as a fault on lines 14. Contacts 74 are closed by an armature 77 linked to the circuit breakers so as to move to the left when breakers 15a are tripped. Contacts 75 are actuated by an armature 78 which may be conveniently actuated by the coil of solenoid relay 70.

Immediately upon detection of a fault, contacts 73 are closed, connecting the potential source 71 to solenoid relay 70, which, in turn, opens contacts 37, closes contact 68, and closes contacts 75. Fault detector 16 also actuates circuit breaker 15 which causes contacts 74 to close. Thereafter, contacts 73 may be reopened without de-energizing solenoid relay 70. Relay 70 will remain energized until the current breaker 15 is reset.

An important feature of the invention is provision of means to select the allowable degree of nozzle opening and the new speed setting of the compressor-turbine unit which will take place on the occurrence of a fault. Means to accomplish this are shown schematically as a nozzle stop cam 80 and movable tap 66 on rheostat 65. Cam 80 and tap 66 are rotated through an electrically actuated clutch 81 by means of the pinion 52 on the fuel regulator. Means to declutch the tap 66 and cam 80 from further rotation by pinion 52 are indicated by solenoid coil 82, connected by lead 83 to line 72.

As indicated previously, the angular position of pinion 52 and the controlled fuel regulator cam 51 are indicative of the load on generator 12. When line 72 is energized, clutch 81 will become disengaged and the tap 66 and nozzle stop cam 80 will remain where they are. Hence the allowable degree of nozzle opening, as well as the resistance added to the nozzle regulator control circuit by rheostat 65 will remain fixed, according to the load which generator 12 was carrying prior to the fault. Although the cam 80 will limit the amount of instantaneous nozzle opening, cam 23 will assume control soon thereafter.

The operation of the invention is as follows. The desired load on the generator 12 is illustrated as being set by hand lever 62. Normal variations in load will rotate cam 51 to increase or decrease fuel flow through the valve 41. The nozzle regulator acts to hold the high pressure or compressor turbine speed at a value set by the turbine exhaust gas temperature. Movable tap 66 and nozzle stop cam 80 will follow variations in loading on generator 12 but will not be active.

Upon the occurrence of a fault, contacts 73 are closed and action is instantaneously accomplished in fractions of a second, whereby contacts 37 are opened and contacts 68, 78 are closed. Closing of contacts 68 decreases the resistance of the fuel regulator control circuit 19a. The rheostat 67 has been preset to one which allows a minimum fuel flow through the nozzles 10 to prevent the combustion chambers from becoming extinguished. Opening contacts 37 adds resistance set on rheostat 65 to the nozzle regulator control circuit 39a, thus telling the nozzle to instantaneously open. The instantaneous degree of nozzle opening is limited by nozzle stop cam 80. Clutch 81 is disengaged at the same time so that the position of the nozzle stop cam 80 and movable tap 66 will not be affected as cam 51 rotates to give a lower fuel output.

Opening of the nozzle vanes 8 has an instantaneous effect upon the relative torques supplied to rotors 5, 6. Energy available to rotor 5 is increased and energy available to rotor 6 is decreased. There is no need to dissipate energy; it is simply redistributed in a manner to immediately reduce the torque supplied to generator 12.

Inasmuch as opening the nozzle serves to redistribute energy within the turbine rather than to attempt to cut it off at its source, reduction of torque on the low moment of inertia load turbine 6 is accomplished almost instantaneously. Although increased energy is imparted to the compressor turbine rotor 5, serving to increase the air flow momentarily, the fuel which is burned in this air is caused to be reduced also at the moment of the fault. Also the high moment of inertia of the compressor turbine rotor 5 resists the tendency to overspeed. A rapid fall in exhaust temperature due to the fuel reduction will thereafter stabilize operation at a reduced air flow.

Upon clearance of the fault, breakers 15a will reclose, opening contacts 77, and deenergizing solenoid 70. Armature 69 will move to the left closing contacts 37 and opening contacts 68. At the same time, clutch solenoid 82 is deenergized and as the load increases to its previous value the clutch elements will reengage at the proper position. Since resistances 65, 67 are no longer active in control circuits 19a, 39a, the fuel regulator and nozzle regulator are again in control according to load and exhaust temperature.

The stabilizing system of the invention provides a significant improvement in power generation systems as opposed to those supplied by steam turbines, single shaft gas turbines, or two-shaft gas turbines with fixed interstage nozzles. The immediate redistribution of energy, i.e., the shift of a large portion of the available energy from the load turbine to the compressor turbine, makes it possible for the power input to match or to even be lower than the new power output. Even though the load turbine has a low moment of inertia, the sudden diverting of energy to the high inertia compressor turbine causes the load turbine to be stable upon loss of load. Although reclosing of the breakers to reapply load will insure stability if done quickly enough, the foregoing arrangement provides stable operation, even if the breakers are not closed for a substantial time period.

Other modifications of the invention will occur to those skilled in the art, and while there has been described what is at present considered to be the preferred embodiment of the invention, it is, of course, intended to cover in the appended claims all such modifications as fall within the true spirit and scope of the invention.

What I claim as new and desire to secure by Letters Patent of the United States is:

1. In a gas turbine of the type having a compressor furnishing air to a combustion chamber to burn fuel therein and having a first turbine driving the compressor and discharging motive fluid through a variable nozzle to a second mechanically independent load-driving turbine, the combination of:

first electrohydraulic governing means adjusting the opening of said variable nozzle in response to speed variations of the first turbine from a first speed setting, second electrohydraulic governing means adjusting the rate of fuel flow in response to load variations on the second turbine from a second setting, and means responsive to sudden loss of load from the second turbine and before substantial speed changes thereof for simultaneously increasing the first speed setting to open the nozzle wider and decreasing the second setting to reduce the fuel flow, whereby a larger proportion of the available energy in the motive fluid is shifted to the first turbine from the second turbine while the total energy available to the gas turbine is decreased.

2. In a gas turbine of the type having a compressor furnishing air to a combustion chamber to burn fuel therein and having a first turbine driving the compressor and discharging motive fluid through a variable nozzle to a second mechanically independent load-driving turbine, the combination of:

first electrohydraulic governing means controlling the position of said variable nozzle in response to speed variations of the first turbine from a first speed setting, second electrohydraulic governing means controlling the rate of fuel flow in response to load variation of the second turbine from a second setting, third means responsive to sudden loss of load from the second turbine and before substantial speed changes thereof for simultaneously increasing the first speed setting to open the nozzle wider and decreasing the second setting to reduce fuel flow, and fourth means actuated by said third means for limiting nozzle opening to a position determined by the load on the second turbine when the fourth means is actuated.

3. In a two-shaft gas turbine of the type having a compressor furnishing air to a combustion chamber to burn fuel therein and having a first turbine driving the compressor and discharging motive fluid through a variable nozzle to a second mechanically independent turbine driving a generator supplying power to an electrical network, the combination of:

governing means controlling the operation of the gas turbine by adjusting variable nozzle positions and fuel flow in response to first and second operating conditions respectively of the first and second turbines respectively, and means responsive to a fault in said electrical network resulting in a loss of load on the generator arranged to actuate said governing means to simultaneously open said nozzle to an extent determined by the load on the generator prior to the fault and to initiate reduction in fuel flow to a minimum selected value.

4. In a power generation system of the type having a gas turbine driving a generator supplying electrical power to a transmission network, said gas turbine being of the type having a compressor furnishing air to a combustion chamber to burn fuel therein and having a first turbine driving the compressor and discharging motive fluid through a variable nozzle to a second mechanically independent turbine driving the generator, the combination of:

first electrohydraulic governing means positioning said variable nozzle in response to speed changes of the first turbine, second electrohydraulic governing means controlling the rate of fuel flow in response to load variations on the generator, and means responsive to a fault in said electrical network for simultaneously opening wider said nozzle and reducing the rate of fuel flow called for by the second governing means, whereby a greater proportion of energy available in the motive fluid in the turbine is shifted from the second turbine to the first turbine while total energy available to both the first and second turbines is reduced through reduction of the fuel flow.

5. The combination according to claim 4, including additional means continuously setting the extent of maximum nozzle opening according to the load carried by the generator, said additional means being disabled by said fault-responsive means to fix the maximum nozzle opening when the fault occurs.

6. In an electrical generation system comprising a generator supplying electrical power to an electrical network, said generator being driven by a gas turbine of the type having a compressor furnishing air to a combustion chamber to burn fuel therein and having a first turbine driving the compressor and discharging motive fluid through a variable nozzle to a second mechanically independent turbine driving the generator, the combination of:

first and second tachometer generators driven by the first and second turbines respectively and furnishing electrical potentials proportional to the respective speeds thereof, first electrohydraulic governing means including a first series electrical circuit having first current responsive means connected therein for opening the nozzle as the current decreases, said first circuit being supplied by said first generator, second electrohydraulic governing means including a second series electrical circuit having second current responsive means connected therein for decreasing fuel flow as the current increases, said second circuit being supplied by said second generator, and electrical relay means responsive to a fault on the transmission lines including selected resistors connectable to simultaneously add resistance to the first circuit and decrease resistance in the second circuit when said relay means are actuated.

References Cited by the Examiner

UNITED STATES PATENTS

| | | | |
|---|---|---|---|
| 1,524,562 | 1/1925 | Kuyser | 317—21 |
| 2,625,789 | 1/1953 | Starkey | 60—39.25 X |
| 2,828,448 | 3/1958 | Perkins et al. | 317—19 |
| 3,168,810 | 2/1965 | Gatzemeyer et al. | 60—39.25 X |
| 3,181,295 | 5/1965 | Pauwels et al. | 60—39.16 |

ORIS L. RADER, *Primary Examiner.*

G. SIMMONS, *Assistant Examiner.*